Feb. 27, 1968 A. WALZ ET AL 3,371,263

STABILIZED MAINS RECTIFYING CIRCUIT ARRANGEMENT

Filed Sept. 21, 1962

9 Sheets-Sheet 2

STABILIZED MAINS RECTIFYING CIRCUIT ARRANGEMENT

Filed Sept. 21, 1962

Feb. 27, 1968 A. WALZ ETAL 3,371,263

STABILIZED MAINS RECTIFYING CIRCUIT ARRANGEMENT

Filed Sept. 21, 1962 9 Sheets-Sheet 7

Feb. 27, 1968 A. WALZ ETAL 3,371,263

STABILIZED MAINS RECTIFYING CIRCUIT ARRANGEMENT

Filed Sept. 21, 1962 9 Sheets-Sheet 9

3,371,263
STABILIZED MAINS RECTIFYING CIRCUIT ARRANGEMENT

Alfred Walz, Emmendingen, Baden, and Robert Östreicher, Teningen, Baden, Germany, assignors to Messrs. Frako Kondensatoren- und Apparatebau G.m.b.H., Teningen, Baden, Germany, a corporation of Germany Filed Sept. 21, 1962, Ser. No. 225,282
Claims priority, application Germany, Sept. 21, 1961, F 34,969
6 Claims. (Cl. 321—25)

Figure 1:
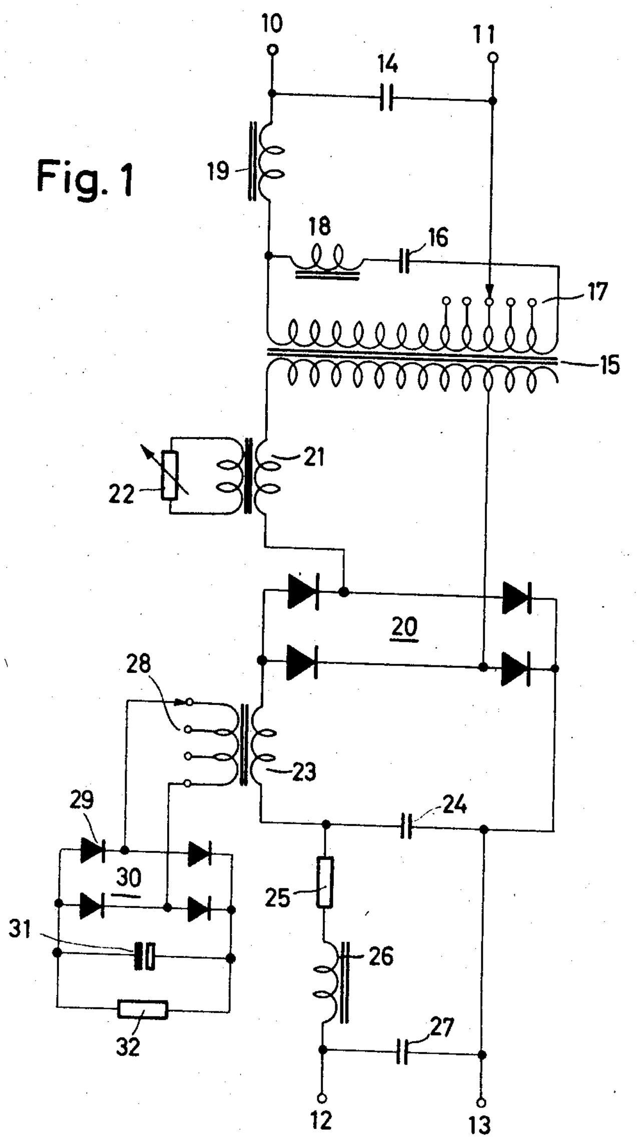

The invention relates to a stabilized mains rectifying circuit arrangement for producing a substantially constant output voltage, in particular a direct-current output voltage, which is independent of mains voltage fluctuations within a predetermined range of the direct output current, using a transformer operating under no-load conditions in the magnetically super-saturated range, with a condenser connected in parallel with one winding and with a leakage flux path between the primary and secondary windings or with a choke coil connected in series with the primary winding and saturated only on full load.

This is a circuit arrangement in which a resonant circuit tuned substantially to mains frequency and with supersaturated iron-core inductance is connected in series electrically with a substantially unsaturated iron-core inductance. Such circuit arrangements have the property of compensating the effect of fluctuations of the mains voltage on the output voltage within wide limits. For example, they are suitable for supplying charging devices for storage batteries, in which case the charging characteristic may exhibit a section of constant current and a section of constant voltage.

One of the objects of the invention is to provide a circuit arrangement of the above-mentioned kind in which adjustment of the output characteristic can be effected with relatively simple means, in order to compensate for voltage drops occurring in the circuit and thereby also to make the output voltage substantially independent of load variations.

A further object of the invention is to provide, for the circuit arrangement mentioned at the beginning, a mains transformer which can be produced in simple manner with relatively small manufacturing tolerances and which supplies on its own account a substantially constant output voltage.

The mains rectifying circuit arrangement according to the invention is characterized in that a choke coil of variable inductance is provided in the alternating-current output circuit of the transformer and/or in the direct-current output circuit of the arrangement. In particular, when a transformer operating in the magnetically supersaturated range is employed with a choke coil connected in series with the primary winding and saturated only at full load, there may be provided for influencing the output characteristic, in addition to the choke coil arranged in the alternating-current and/or direct-current circuit of the transformer, a variable point of connection of the supply line to that winding of the transformer with which a condenser is connected in parallel. In this way, the output characteristic of the rectifying circuit arrangement can be varied within a certain range whereby, moreover, any manufacturing tolerances in the production of the mains transformer can be compensated. For this reason, the transformer and the circuit arrangement can be produced at lower cost.

In order to change the inductance, the winding of the choke coil located in the alternating-current or direct-current output circuit of the mains transformer can be bridged by a variable resistance. On the iron core of the choke coil located in the alternating-current or direct-current output circuit of the mains transformer there may also be provided a second winding, the ends of which are connected by way of a variable resistance. Preferably, the choke coil located in the direct-current circuit is designed in this way, the second winding being terminated by a rectifying bridge the direct-current output of which is fed to a parallel arrangement consisting of a condenser and a variable resistance. With this circuit arrangement a comparatively strong damping of the voltage and/or current fluctuations occurring in the direct-current circuit is obtained, which is particularly important where a circuit arrangement according to the invention is employed for supplying telephone exchanges, since in this case the arrangement is subjected to very marked and briefly occurring load fluctuations by the selector impulses.

The adjustment of at least one choke coil or the variation of the point of connection of the supply line to the transformer winding having a condenser connected in parallel therewith can be effected automatically in dependence upon an output quantity of the circuit arrangement. For example, the output voltage of the circuit arrangement can be employed for controlling an electronic regulating device which effects the adjustments or variations in known manner.

When a transformer is employed having a secondary winding connected with a condenser to form a resonance circuit and having a leakage path of increased magnetic resistance so arranged between the primary winding and the secondary winding that a part of the magnetic flux can permeate one of the windings to the exclusion of the other, the transformer core can be built up in manner known per se out of laminations with a preferred magnetic direction. In this case the laminations of that part of the transformer core which carries the main flux have the latter passing through them exclusively in the preferred magnetic direction and the laminations forming the magnetic leakage path are so arranged that the preferred magnetic direction and the magnetic leakage direction differ from one another. The magnetic leakage path may consist of at least one bundle of laminations, the preferred magnetic direction of which extends at right angles to its longitudinal direction, cut strip core halves carrying windings being attached substantially without any air gap on both sides of this bundle of laminations, namely on the end faces of the latter. Two cut strip core halves with a common bundle of laminations forming the leakage paths can be provided in each case for the primary winding and the secondary winding. However, it is also possible to associate separate bundles of laminations forming the leakage paths with the cut strip core halves.

The primary and secondary windings of the transformer may be arranged at a distance apart on a magnet core and be embraced by at least one E-shaped magnet yoke, the middle limb of which projects between the windings and forms an air gap with the magnet core. The primary and secondary windings may, however, also be arranged on the middle limb of a shell-type transformer core and magnet cores can be so inserted between the windings, namely in the gap between the middle limb and the outer limb, that air gaps are left between the limbs and cores.

Figure 2:
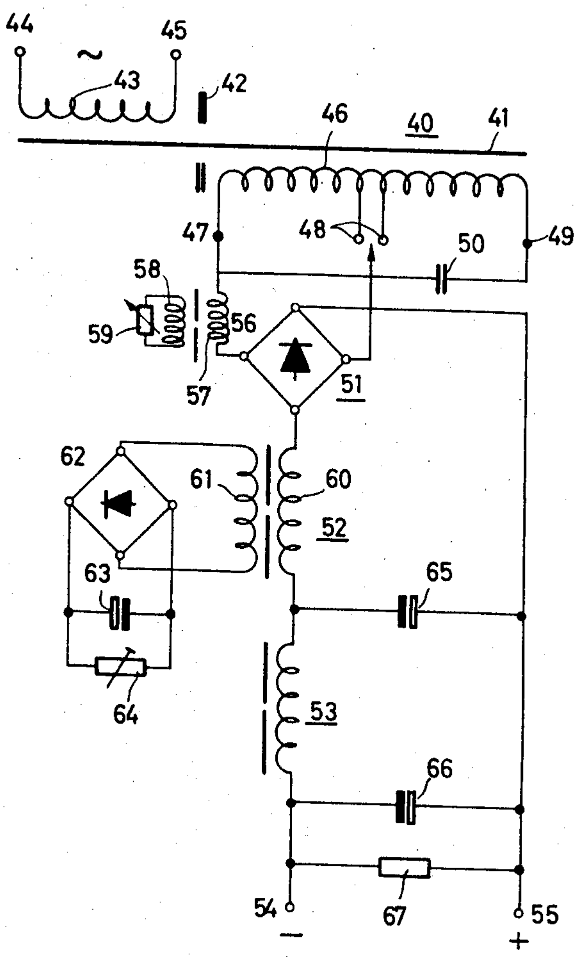
Figures 3, 4:
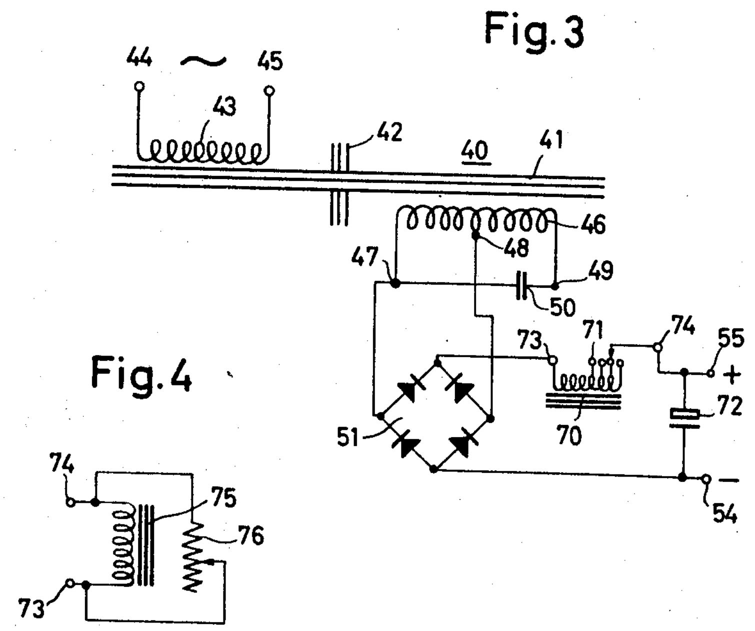
Figure 5:
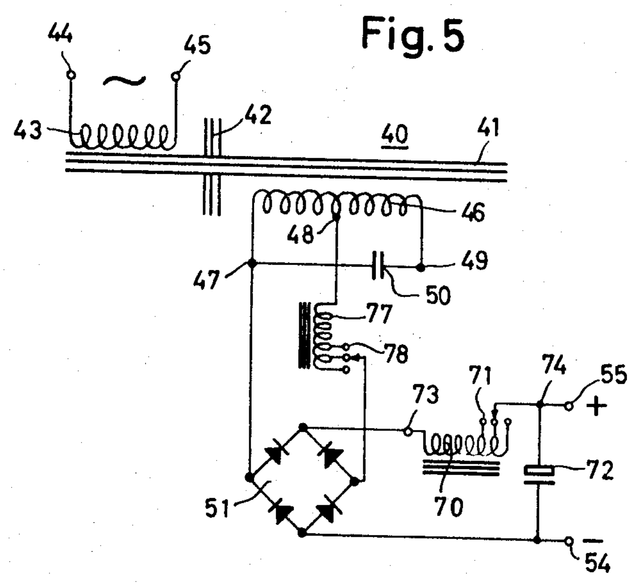
Figure 6:
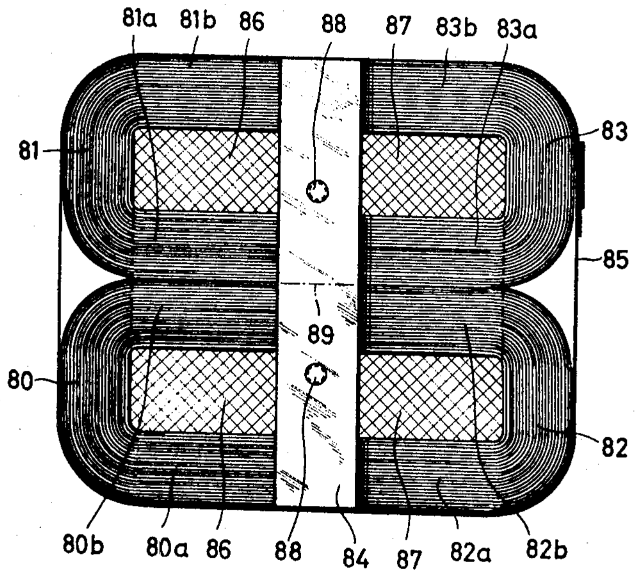
Figure 7:
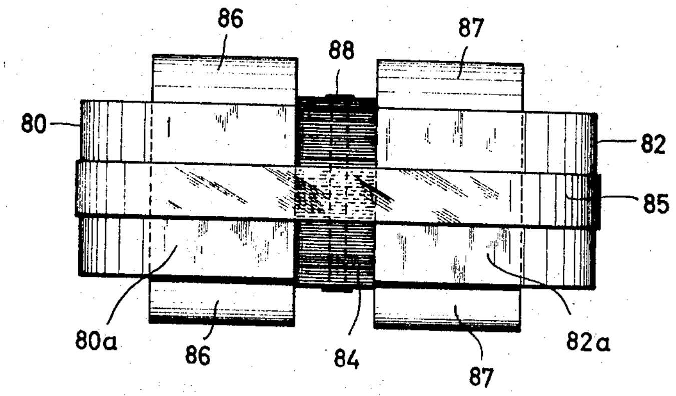
Figure 8:
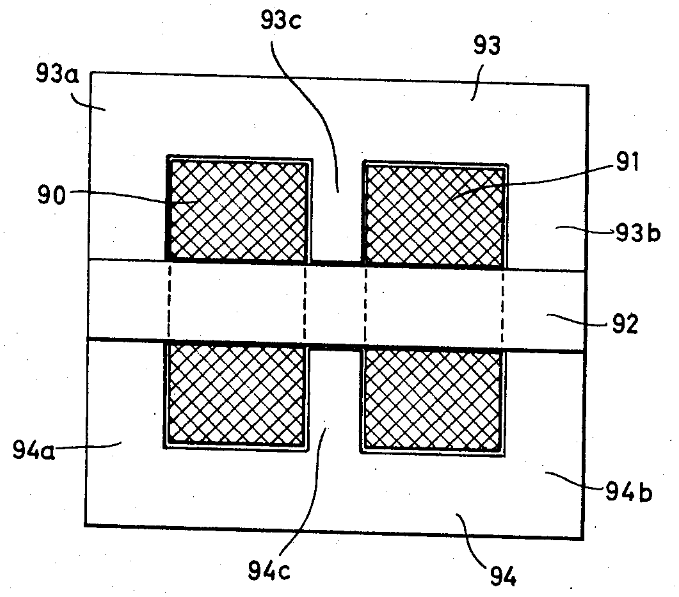
Figure 9:
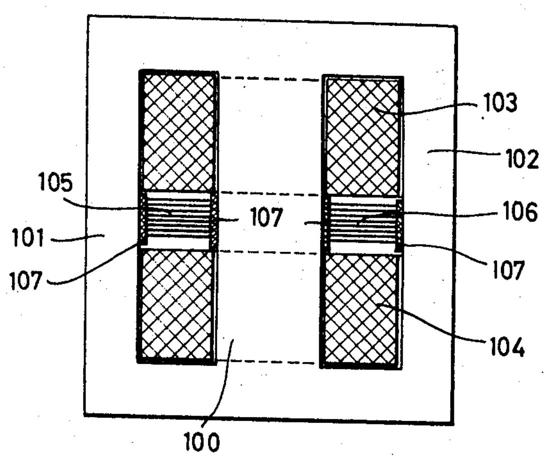
Figure 10:
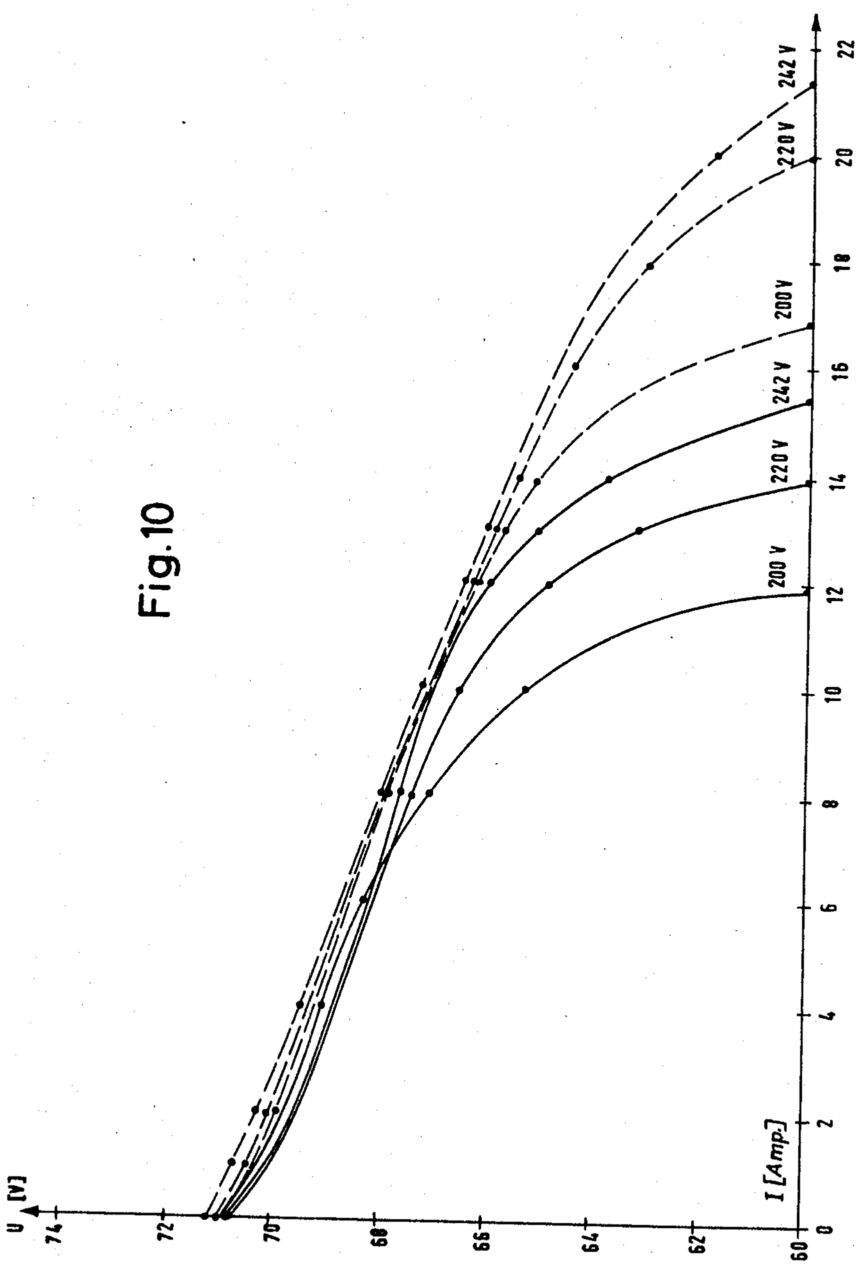
Figure 11:
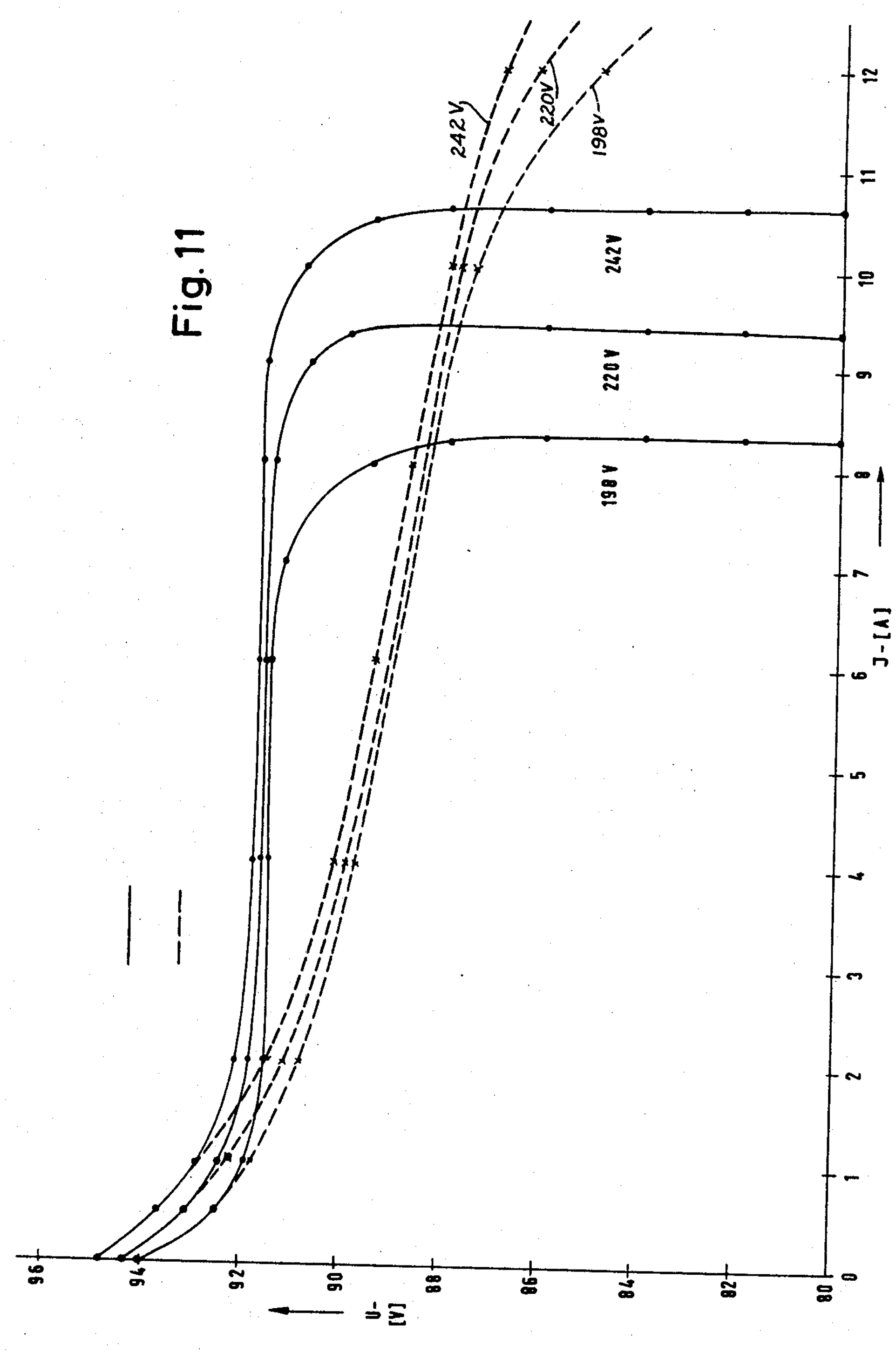

The invention is described more fully hereinafter with reference to the drawings which illustrate, by way of example a number of embodiments of the invention. In the drawings:

FIGURE 1 shows a circuit arrangement using a transformer with a choke coil connected in series with the primary winding, FIGURE 2 shows a circuit arrangement using a transformer with a leakage path between the primary and secondary windings, FIGURES 3 to 5 illustrate modifications of the circuit arrangement according to FIGURE 2, FIGURE 6 shows a constructional form of the transformer employed in the circuit arrangements according to FIGURES 2 to 5, the winding being shown in section for greater clarity, FIGURE 7 is a side view of the transformer according to FIGURE 6, FIGURES 8 and 9 shows two further constructional forms of the transformer according to FIGURES 6 and 7, using punched transformer laminations, the increased resistance of the magnetic leakage path being obtained by means of air gaps, FIGURE 10 is a graphic representation of the dependence of the output voltage of the transformer, FIGURE 11 is a graphic representation of the dependence of the direct-current output voltage of the circuit arrangement on the mains voltage and the load, in the case of a circuit arrangement according to FIGURE 3 (solid curves) and with short-circuited choke coil in the direct-current circuit (dashed curves), and FIGURES 12 to 14*b* show further constructional forms of a transformer with a leakage path.

In FIGURE 1, the references 10 and 11 designate input terminals for connection to the alternating-current supply mains. The references 12 and 13 designate the output terminals which deliver the direct-current voltage to a load, for example to a storage battery which is to be charged. The reference 14 designates a condenser connected in parallel with the input terminals 10 and 11 and which acts to improve the power factor of the circuit. It is not of decisive importance as regards the manner in which the remainder of the circuit is connected up.

The reference 15 denotes the mains transformer which operates in a substantially saturated state under no-load conditions, whereas it operates in a substantially unsaturated state at full load. The current is supplied from the mains terminal 11 to an intermediate point on the primary winding of the transformer 15 in such manner that that condenser branch which is connected to the primary coil of the transformer and which contains a condenser 16 is coupled so that it is transformed as regards voltage. The primary winding of the transformer 15 has a number of connecting terminals 17 by means of which the point of connection of the mains terminal 11 can be varied.

The reference 18 designates a choke coil which is advantageously in the form of an iron-cored choke coil with an air gap. In contrast to a choke coil 19, the choke coil 18 operates, just like the transformer 15, in a saturated state under no-load conditions, whereas at full load it operates in a less saturated state.

In the secondary circuit of the mains transformer 15 there is arranged a full-wave rectifying bridge 20 which is supplied through a choke coil 21 which also advantageously takes the form of an iron-cored choke coil with an air gap. On the iron core of this choke coil 21 there is provided a second winding which is bridged by a variable resistance 22. The effective inductance of the choke coil 21 can thus be varied by varying the resistance 22.

In the direct-current circuit are disposed a variable choke coil 23, a condenser 24, a resistance 25, a choke coil 26 and a condenser 27. The choke coil 23 is also advantageously formed as an iron-cored choke coil but without an air gap and operates in a saturated state at full load. The choke coil 23 has several connecting terminals 28, and a resistance can be connected to these terminals. Preferably, the second winding of the choke coil 23 is terminated by a rectifying bridge 30 formed by rectifying elements 29 and the output of which is carried to a parallel arrangement consisting of a condenser 31 and a resistance 32. The resistance 32 is preferably of variable type. This arrangement is particularly suitable for suppressing the frequently existing tendency of the circuit arrangement as a whole to perform natural oscillations in the direct-current circuit.

The choke coil 26 preferably has an air gap and operates in such manner that it is not saturated or just reaches saturation at full load. The condensers 24 and 27 and the resistance 25 and the choke coil 26 form a smoothing network.

The variable point of connection of the mains terminal 11 to the primary winding of the transformer 15 and the use of the variable inductance 23 render possible smaller dimensioning of the remaining structural parts with otherwise equal requirements as regards the compensation of fluctuations in the output voltage between full load and no-load.

The adjustment of at least one of the choke coils 21 and 23 and/or the variation of the point of connection 17 of the mains supply line to the primary winding of the mains transformer 15 is preferably effected automatically in dependence upon an output parameter of the circuit; for example, the output voltage at the terminals 12 and 13 can be used for controlling an electronic regulating device which varies the resistance 22 and/or the connection to the choke coil 23 at 28. The variation of the inductance of the choke coil 23 can also be effected by varying the resistance 32. At the same time, a variation in the point of connection of the mains supply line to the transformer 15 can also be effected by the regulating device. An advantageous effect is obtained, however, if only the choke coils are adjustable.

In the circuit arrangement according to FIGURE 2 there is employed a special mains transformer 40 which contains a main core 41 and a magnetic leakage path 42. The reference 43 denotes a primary winding of the transformer with input terminals 44 and 45. The reference 46 denotes the transformer secondary winding with the terminals 47, 48 and 49. A condenser 50 is connected to the terminals 47 and 49 and forms a resonant circuit with the secondary winding 46.

By means of the magnetic leakage path 42, the magnetic flux in the transformer core is afforded the possibility of permeating one winding 43 or 46 to the exclusion of the other. In this way, the secondary voltage stabilized with the resonant circuit condenser 50 can substantially maintain its own energization by way of the leakage path 42 even in the event of fluctuations of the magnetic flux in the primary energizing winding. What is essential for such operation is that the magnetic resistance of the main iron path or circuit is smaller than the normal magnetic resistance of the leakage path. It has been found that a particularly good utilization of the magnetic material is possible when the transformer 40 is constructed with the aid of cut strip cores. In this case, not only is high efficiency of the circuit arrangement obtained, but the consumption of material required for the transformer can also be kept small.

The output circuit connected to the secondary winding 46 of the transformer 40 corresponds substantially to that of the circuit arrangement according to FIGURE 1. The rectifying bridge 51 is connected to the secondary winding end terminal 47 and one of the secondary tappings 48, and its output is fed by way of choke coils 52 and 53 to the output terminals 54 and 55. To these terminals 54 and 55 the load is in use connected, for example a storage battery which is to be charged.

In the secondary alternating-current circuit there is located a choke coil 56 having windings 57 and 58, the latter of which is bridged by a variable resistance 59. The choke coil 52 in the direct-current circuit has windings 60 and 61, the latter of which is connected to a rectifying bridge 62, the direct-current output of which is fed to a parallel arrangement consisting of a condenser 63 and a variable resistance 64.

The condensers 65 and 66, the choke coil 53 and the resistance 67 together form the smoothing network.

FIGURES 3 and 5 show two modified forms of the circuit arrangement of FIGURE 2. The transformer 40 corresponds with its leakage path 42 and windings 43 and 46 to that of FIGURE 2. In the output circuit of the rectifying bridge 51 there is connected a choke coil 70. This choke coil 70 contains a number of tappings 71 by means of which its inductance can be varied. The output terminals 54 and 55 of the direct-current circuit are bridged by a condenser 72. By means of the choke coil 70 there is obtained additional compensation for the effects of load variations. The adjustment of the choke coil 70 can be achieved in various ways. Instead of the choke coil 70 with tappings 71 shown in FIGURE 3, a choke coil 75 can be connected to the terminals 73 and 74, as shown in FIGURE 4. Connected in parallel with the choke coil 75 is a resistance 76, the resistance value of which is adjustable.

FIGURE 5 shows a circuit arrangement modified in comparison with the circuit arrangement of FIGURE 3 and in which an additional variable choke coil 77 is provided in the secondary alternating-current circuit of the transformer. Compensation of variations in the secondary voltage due to load variations is also possible by means of this choke coil. The choke coil 77 is also operative without a rectifying bridge 51 connected at the output end and by itself effects an improvement in the constancy of the secondary alternating-current voltage during load variations. The variability of the choke coil 77 can be obtained not only by means of the tappings 78, but also in some other way. For example, instead of the choke coil 77, it is possible to employ a transducer, the inductance of which is varied by means of adjustable premagnetization.

FIGURES 6 and 7 show an example of construction of the main transformers employed in the circuit arrangements of FIGURES 2 to 5, the references 80 to 83 designating four cut strip core halves which are attached to the straight core part 84. The cut strip core halves 80 to 83 are produced in known manner. Magnetic sheet metal having a longitudinally extending preferred magnetic direction is wound, for example, on a mandrel and the individual layers of sheet metal are struck together by an annealing process and the coil produced in this way is divided in the middle. The magnetic flux flowing through the core halves consequently always permeates the individual sheets or laminations in the preferred magnetic direction.

A straight core part 84 consists of laminations stacked one above the other and likewise having a preferred magnetic direction. In fact, this preferred direction extends at right angles to the longitudinal direction of the core part 84. In this way there are obtained two magnetic circuits in contact with one another and having the following magnetic paths:

Limb 80*a* of the core part 80, core 84, limb 82*a* of the core part 82, limb 82*b* of the core part 82, core 84, limb 80*b* of the core part 80;

Limb 81*a* of the core part 81, core 84, limb 83*a* of the core part 83, limb 83*b* of the core part 83, core 84, limb 81*b* of the core part 81.

In both magnetic circuits the magnetic flux runs exclusively in the preferred magnetic direction of the various laminations.

A primary winding 86 of the transformer is mounted on the limbs 80*b* and 81*a* of the core parts 80 and 81, while the secondary winding 87 is mounted on the limbs 82*b* and 83*a* of the core parts 82 and 83. The individual core parts 80 and 83 are attached laterally to the core 84 in such manner that the end faces of the limbs bear against the end edges of the laminations forming the core 84. The individual laminations of the core 84 are held together by means of rivets 88 which, for example, may consist of brass. Between the end faces of the individual core limbs and the core 84 there is provided a thin electrically insulating layer which is intended to prevent the circulation of eddy currents. The entire arrangement is held together by means of a clamping strap 85.

The increased magnetic resistance of the magnetic core 84 in relation to the leakage flux is obtained due to the fact that the preferred magnetic direction of the individual sheets or laminations extends at right angles to the longitudinal direction of the core, while the leakage flux permeates the core in its longitudinal direction.

The core 84 may be divided along the line 89, that is in a magnetically neutral zone, without the magnetic properties being affected. In this way, however, a firm bearing action of the end faces of the individual core limbs is facilitated. The transformer shown in FIGURES 6 and 7 then consists of two similar parts. Instead of being made up of two parts, the transformer may naturally also be constructed out of only one core part, that is consisting say of the parts 80, 82, 84.

In the transformer core according to FIGURES 6 and 7, although an air gap is not necessary an increased magnetic resistance of the leakage flux path is obtained by the difference of the preferred magnetic direction of the core 84 from the direction of this magnetic leakage flux. As the core 84 can be produced with very accurately fixed properties and exact dimensions, adjustment of the magnetic circuit after assembly is, practically speaking, unnecessary. Firm holding together of the laminations forming the core 84 is ensured by means of rivets 88 which, for example, may consist of brass.

The core of the transformer may also be constructed as shown in FIGURE 8, in which a primary winding 90 and a secondary winding 91 are arranged on a core 92 at a distance from one another and are embraced by two E-shaped yoke parts 93 and 94. The yoke part 93 has the end faces of its limbs 93*a* and 93*b*, and the yoke part 94 the end faces of its limbs 94*a* and 94*b*, resting against the core 92. The magnetic leakage flux path is formed by the middle limb 93*c* and 94*c* between whose end faces and the core 92 air gaps are left which produce the increased reluctance of the leakage flux path.

The transformer may also be designed as shown in FIGURE 9. In this case, a shell-type core has a middle limb 100 and two outer limbs 101 and 102. A primary winding 103 and a secondary winding 104 are arranged at a distance from one another on the middle limb 100. In the gap between the primary winding 103 and the secondary winding 104, that is between the middle limb 100 and the outer limbs 101 and 102, there are arranged two magnet cores 105 and 106 composed of magnetic laminations. Between these cores 105 and 106 and the limbs of the transformer core there are provided magnetically non-conductive layers 107 by which magnetic air gaps are formed which produce the increased reluctance of the leakage flux path.

The transformers described with reference to FIGURES 6 to 9 are not confined to use in the circuit arrangements illustrated in FIGURES 2 to 5. With these transformers by themselves an improvement of the constancy of the alternating-current output voltage is obtained without a rectifying bridge connected on the output side. Thus, the transformers described belong to the invention even without any rectifying bridge connected at the output side.

FIGURE 10 shows output characteristics of the transformer illustrated in FIGURES 6 and 7. The solid lines represent the characteristics of a known arrangement, while the characteristics of the transformer according to the invention are represented by broken lines. It will be apparent from the representation that, by means of the arrangement according to the invention, stabilization of the output voltage for a given load is possible in spite of fluctuating mains voltage with a comparatively small tolerance and this even with a comparatively high load. Moreover, tests have shown that in the constructon according to the invention, the weight of the core of the transformer can be considerably reduced.

FIGURE 11 is a graphic representation of the dependence of the direct-current output voltage on the primary voltage and on the load. The solid lines apply to the circuit arrangement illustrated in FIGURE 3, while the curves drawn in broken lines show the dependence without the choke coil 70. It can be seen clearly that up to a certain load a direct-current output voltage substantially independent of mains voltage fluctuations and load variations is obtained by means of the inserted choke coil 70.

Figure 12:
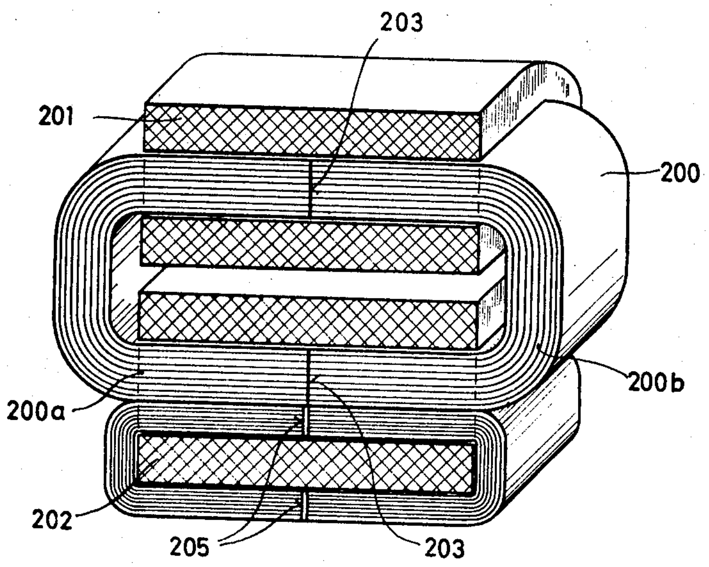

Further examples of embodiment of a transformer with a leakage path and for use with a condenser connected in parallel with one winding are shown in FIGURES 12 to 14*b*. In FIGURE 12 the reference 200 designates a main core of the transformer, which is preferably made of two cut strip core halves 200*a* and 200*b* carrying a primary winding 201 and a secondary winding 202. The cut strip core halves 200*a* and 200*b* are put together at the points 203 substantially without any air gap.

Laterally of the main core 200 there is attached a core 204 serving as leakage flux path and which embraces the secondary winding 202. The core 204 can likewise be made up from two cut strip core halves 204*a* and 204*b*, air gaps being however provided at the points 205 and producing the increased magnetic reluctance.

Figure 13:
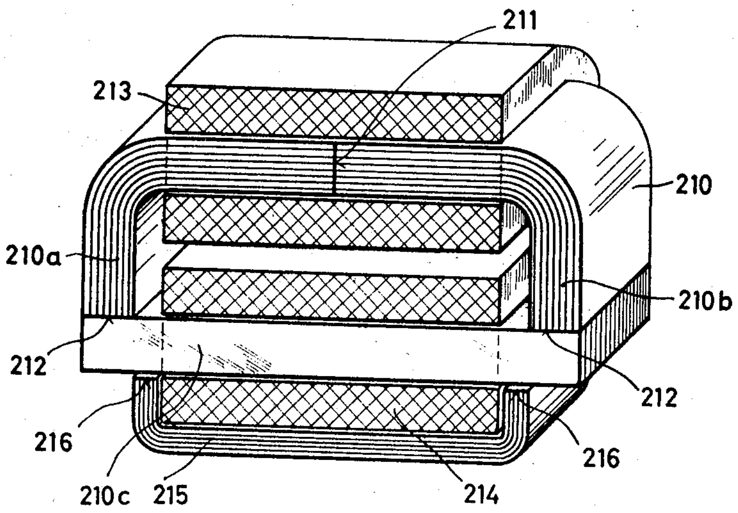

In FIGURE 13, the reference 210 designates a main core of another constructional example of the transformer. A core 210 consists of parts 210*a*, 210*b* and 210*c* which are assembled at the points 211 and 212 substantially without an air gap being formed. A primary winding 213 is arranged on the core parts 210*a* and 210*b*, while a secondary winding 214 is arranged on the straight core part 210*c*. Mounted laterally on this core part 210*c* is an additional core 215 which embraces the secondary winding 214 and forms the magnetic leakage flux path. In order to produce the increased magnetic reluctance, air gaps 216 are provided between the core part 210*c* and the core 215, these air gaps being maintained, for instance, by interposing magnetically non-conductive plates, while the separate core parts are pressed together, for example, by a clamping strap (not shown).

Figure 14A:
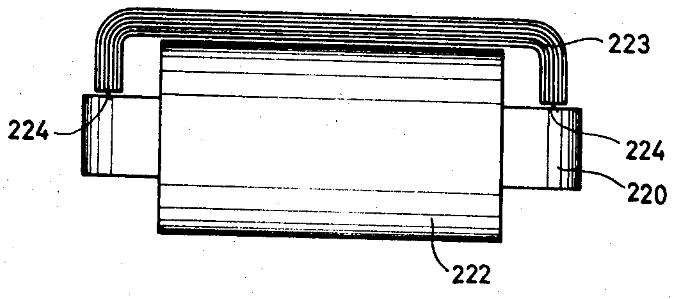
Figure 14B:
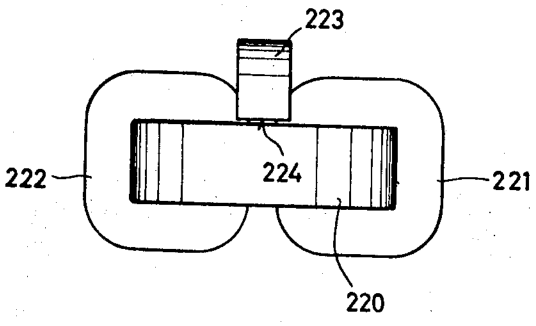

FIGURES 14*a* and 14*b* show a constructional form having a main core 220 which corresponds to the core 200 (FIGURE 12). This core 220 carries a primary winding 221 and a secondary winding 222. The magnetic leakage flux path is formed by the core 223, which is mounted here on the middle portions of the two U-shaped cut strip core parts, air gaps 224 being likewise left between the latter and the core 223.

When the transformers according to FIGURES 12 to 14*b* are employed, the circuit arrangement may be as shown in FIGURE 2, it being possible for any load to be connected to the terminals 47 and 48. Thus, voltage stabilization also occurs with an alternating-current load. The transformers illustrated are particularly advantageous when a rectifying arrangement according to FIGURES 2, 3 and 5 is connected. It should also be mentioned that instead of the load being connected to the terminals 47 and 48 of the winding 46 shown in FIGURE 2, it may also be connected to an additional winding coupled inductively with the winding 46.

The invention has been described with reference to a number of examples, but it is not restricted to these embodiments. It is a matter of course that the circuit arrangements illustrated and the transformer cores illustrated can be modified without departing from the basic concept of the invention.

We claim:

1. An output voltage stabilizing arrangement comprising, in combination, a pair of input terminals for connection to a source of fluctuating A.C. potential; a transformer having a primary winding, a core and a secondary winding; an input circuit connecting said primary winding to said input terminals; a pair of output terminals for connection to a load; an output circuit connecting said secondary winding to said output terminals; said transformer operating in the supersaturated range at no-load; a capacitor connected in parallel with one transformer winding; a choke having a winding connected in said output circuit and having an iron core; and adjusting means operatively connected to said choke and selectively operable to adjust the effective inductance thereof to compensate for the effects of load variation, said adjusting means including a second winding on the iron core of said choke, a rectifier bridge having its input connected across said second winding, and a condenser and a variable resistance connected in parallel across the output of said rectifier bridge.

2. An output voltage stabilizing arrangement as claimed in claim 1, in which said output circuit includes a rectifier having its input connected to said secondary winding and its output connected to said output terminals; said choke having its first mentioned winding connected in series between one output terminal of said rectifier and one of said first mentioned output load terminals.

3. An output voltage stabilizing arrangement, as claimed in claim 1, in which said transformer has a stray magnetic flux path between said primary winding and said secondary winding.

4. An output voltage stabilizing arrangement, as claimed in claim 1, including a choke connected in series with said primary winding and magnetically saturated only at full load.

5. An output voltage stabilizing arrangement, as claimed in claim 2, said primary winding being a tapped winding and having said capacitor connected in parallel therewith; and means operable to vary the connection of said input terminals to the taps of said primary winding automatically as a function of an output quantity of said arrangement.

6. An output voltage stabilizing arrangement as claimed in claim 1, including means operable to adjust said variable resistance automatically as a function of an output quantity of said arrangement.

References Cited

UNITED STATES PATENTS

| | | | |
|---|---|---|---|
| 3,199,020 | 8/1965 | Hilker | 323—89 |
| 3,129,272 | 4/1964 | Godshalk | 323—43.5 |
| 3,076,130 | 1/1963 | Brunette et al. | 321—25 |
| 3,037,159 | 5/1962 | Brown | 321—25 |
| 2,611,889 | 9/1952 | Huge | 321—25 |
| 2,992,386 | 7/1961 | Rosin | 323—56 |
| 2,996,656 | 8/1961 | Sola | 323—45 |
| 3,022,458 | 2/1962 | Sola | 323—45 |
| 2,879,463 | 3/1959 | Malick | 321—25 |
| 2,888,630 | 5/1959 | Seliger et al. | 321—25 |
| 2,989,712 | 6/1961 | Krabbe | 336—217 |
| 3,001,163 | 9/1961 | Pfuntner et al. | 336—117 |
| 2,992,386 | 7/1963 | Rosin | 323—56 |
| 2,825,865 | 3/1958 | Hauck | 323—56 |
| 2,764,725 | 9/1956 | Buil | 323—56 |
| 2,364,558 | 12/1944 | Stocker | 323—48 |

JOHN F. COUCH, *Primary Examiner*.

J. M. THOMPSON, M. L. WACHTELL, H. HUBERFELD, *Assistant Examiners*.